US008601796B2

(12) United States Patent
Hinz et al.

(10) Patent No.: US 8,601,796 B2
(45) Date of Patent: Dec. 10, 2013

(54) DIESEL CATALYST SYSTEM

(75) Inventors: Andreas Hinz, Onsala (SE); Jonas Jansson, Göteborg (SE); Hans Bernler, Mölndal (SE); Ulrich Gobert, Hisings-Kärra (SE)

(73) Assignee: Volvo Lastvagnar AB, Göteborg (SE)

( * ) Notice: Subject to any disclaimer, the term of this patent is extended or adjusted under 35 U.S.C. 154(b) by 445 days.

(21) Appl. No.: 12/304,758

(22) PCT Filed: Jun. 13, 2006

(86) PCT No.: PCT/SE2006/000703
§ 371 (c)(1),
(2), (4) Date: Aug. 13, 2009

(87) PCT Pub. No.: WO2007/145548
PCT Pub. Date: Dec. 21, 2007

(65) Prior Publication Data
US 2010/0064662 A1    Mar. 18, 2010

(51) Int. Cl.
*F01N 3/035*      (2006.01)

(52) U.S. Cl.
USPC .............................................. 60/295; 60/301

(58) Field of Classification Search
USPC .................... 60/286, 295, 301, 311
See application file for complete search history.

(56) References Cited

U.S. PATENT DOCUMENTS

| | | | |
|---|---|---|---|
| 6,182,443 B1 | 2/2001 | Jarvis et al. | |
| 6,916,450 B2 | 7/2005 | Akama et al. | |
| 2003/0110761 A1* | 6/2003 | Minami | 60/280 |
| 2004/0175315 A1 | 9/2004 | Brisley et al. | |
| 2004/0237507 A1* | 12/2004 | Duvinage et al. | 60/276 |
| 2005/0031514 A1 | 2/2005 | Patchett et al. | |
| 2005/0284134 A1* | 12/2005 | Radhamohan et al. | 60/286 |
| 2007/0199320 A1* | 8/2007 | Yager et al. | 60/599 |

FOREIGN PATENT DOCUMENTS

| | | |
|---|---|---|
| DE | 4214183 A1 | 6/1993 |
| EP | 1286027 A1 | 2/2003 |
| EP | 1298291 A3 | 4/2003 |
| EP | 1403477 A2 | 3/2004 |
| JP | 2001329829 | 11/2001 |
| WO | 0037780 A1 | 6/2000 |
| WO | 0064566 A1 | 11/2000 |
| WO | 03054364 A2 | 7/2003 |
| WO | 03091551 A1 | 11/2003 |

OTHER PUBLICATIONS

International Search Report for corresponding International Application PCT/SE2006/000703.
International Preliminary Report on Patentability for corresponding International Application PCT/SE2006/000703.
Supplementary European Search Report from corresponding European App. EP 06 74 7896.

* cited by examiner

*Primary Examiner* — Kenneth Bomberg
*Assistant Examiner* — Jonathan Matthias
(74) *Attorney, Agent, or Firm* — WRB-IP LLP

(57) ABSTRACT

A selective catalytic reduction system for reducing nitric oxides emission levels from a compression ignition engine includes a first reductant injector located upstream a first catalyst including a selective catalytic reduction coating. A second reductant injector is located downstream the first catalyst; and a second catalyst is placed downstream the second reductant injector and includes a selective catalytic reduction coating.

8 Claims, 2 Drawing Sheets

DIESEL CATALYST SYSTEM

BACKGROUND AND SUMMARY

The present invention relates to a selective catalytic reduction system for reducing nitric oxide emission levels from a compression ignition engine, comprising a first reductant injector located upstream a first catalyst comprising a selective catalytic reduction coating.

In the art of combustion engines, there has been a growing concern regarding emissions, at least since the early 1970's. For SI (spark ignition) engines, the emissions can hardly be regarded as a problem after the three-way catalyst was put on the market in the mid 70:s. For CI (compression ignition) engines, the situation is, however, slightly more complicated; CI engines have inherently high emission levels of nitric oxides (NOx) and particles (soot). Due to the nature of the engine combustion in a CI engine, a large amount of air is namely inducted into the cylinders, whereupon the air is compressed. Thereafter, an amount of fuel varying as a function of engine load is injected into the compressed air. The injected fuel will auto-ignite due to the high temperature resulting from the compression of the air. The injected fuel will burn in a diffusion mode, i.e. the combustion speed will be more or less controlled by the mixing rate between the injected fuel and the compressed air. Soot will form in fuel rich zones and NOx will form in combustion zones where the temperature is high and enough oxygen is left to form NOx.

One obstacle concerning exhaust aftertreatment for reducing NOx in CI engine exhausts is the presence of oxygen; as implied earlier, a large amount of air is inducted in the cylinders prior to fuel injection. Hence, there is always a surplus of air in the cylinders, compared to the amount of air necessary to completely combust all the injected fuel. An air surplus in the exhausts makes it impossible to use a standard three-way catalyst in order to reduce NOx emissions. Soot (or particles) is/are also a major problem for CI engines; soot forms, as mentioned, in fuel rich combustion zones. High fuel injection pressures, that form small fuel droplets, can reduce soot formation significantly, but there are design limitations on how high injection pressure that can be accepted.

There are methods to reduce NOx formation in CI engines; the most common way is to delay injection timing. By delaying injection timing, the maximum combustion temperature can be reduced, which in turn will decrease NOx formation. The NOx reduction comes, however, with some severe penalties, namely that both soot formation and fuel consumption increase with later injection timing.

One efficient way of reducing NOx emissions is to use an SCR (Selective Catalytic Reduction) emission aftertreatment system. A common SCR system comprises a substrate coated with e.g. zeolites, V-oxides (e.g. V2Os), Cu-zeolites, Fe-zeolites or any other known material suitable for SCR. Unlike three-way catalysts for SI engines, SCR systems cannot work in an environment consisting of exhausts only; some additional agent, e.g. a reductant, must be added to the exhaust gas. A common such agent is urea, i.e. (NH2)2CO, as well as hydrocarbons or hydrogen.

The efficiency of an SCR catalyst, related to the driving cycle, is limited to about 65-80 percent, and its function is severely impaired by the presence of soot. For exhaust aftertreatment of soot emission, a filter is used; such a filter does however require regeneration at intervals varying with engine load conditions. The regeneration mostly means that the exhaust temperature is increased by any means, e.g. by extremely late fuel injection, a post injection, by inlet air throttling, or by any other suitable means. The increased exhaust temperature allows soot particles trapped in the filter to "burn off", i.e. react with oxygen in the exhausts to form carbon dioxide and water. However, every regeneration sequence results in a fuel economy penalty. Present and future legislation concerning $NO_x$ emissions will make it virtually necessary to combine late fuel injection, SCR systems and soot filters. This leads to a "vicious circle", ultimately resulting in a high fuel consumption, which in turn leads to an increased greenhouse effect and a bad driving economy.

If the NOx exhaust aftertreatment could be improved, then the vicious circle should be broken; the fuel injection timing could be set to a setting giving a minimum fuel economy, from which would follow decreased soot formation, which in turn would make NOx reduction easier.

It is desirable to provide an exhaust aftertreatment system enabling a high NOx conversion factor.

According to an aspect of the present invention a second reductant injector is located downstream the first catalyst and a second catalyst is placed downstream the second reductant injector and comprising a selective catalytic reduction coating.

In one aspect of the invention, the first catalyst comprises a filter function to trap particles formed by the CI combustion. In this aspect, the first catalyst could comprise a multitude of elongate cells with alternately closed and open top and bottom ends, respectively, wherein an exhaust gas flow is forced to pass through cell walls constituting the cells, and wherein the selective catalytic reduction coating is coated on either or both sides of the walls.

In order to further provide the system according to the invention with an oxidizing capability, an oxidizing catalytic coating could be coated on an upstream side of the cell walls.

For fine-tuning of the amount of reductant to be injected by the reductant injectors, sensors sensing presence of nitric oxides and/or ammonia in the exhaust gas could be arranged in the exhaust gas stream. One embodiment of the fine-tuning comprises placing the sensors downstream the filter function and downstream the second catalyst, respectively. Another embodiment comprises just one sensor for NOx or NH3 being placed downstream the second SCR catalyst.

BRIEF DESCRIPTION OF THE DRAWINGS

In the following, the invention will be described with reference to the appended drawings, wherein:

FIG. 2b is a sectional side view of the filter medium shown in FIG. 2a.

DETAILED DESCRIPTION

Figure 1:
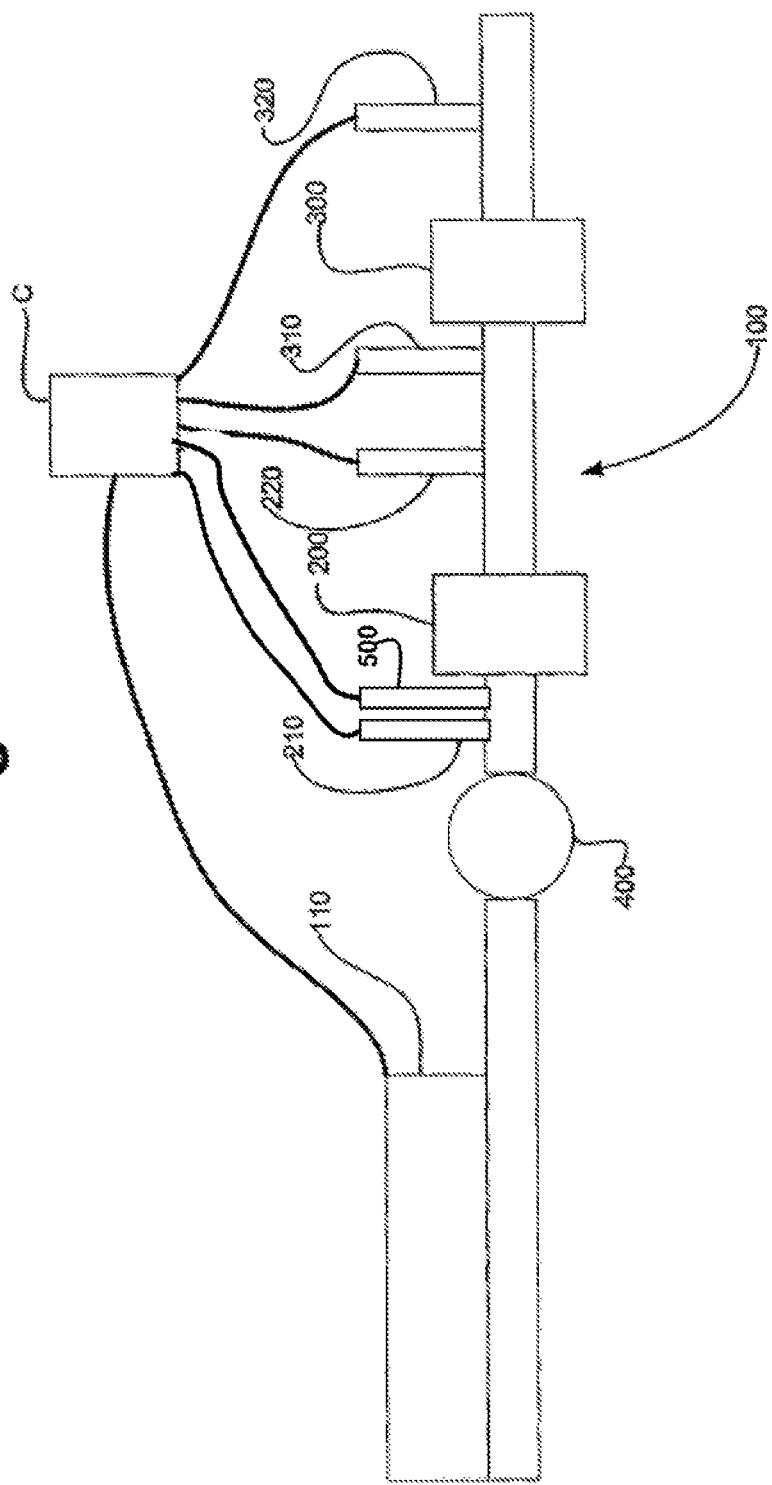
FIG. 1 is a schematic view of a catalyst system according to the present invention.

In FIG. 1, a schematic view of a catalyst system 100 according to the present invention is shown. The catalyst system 100 is connected to an exhaust system of an engine 110 and comprises a first catalyst 200, the design of which will be described later, a second catalyst 300, and an exhaust pressure governor (EPG) 400. Moreover, first and second reductant injectors 210 and 310, respectively, are mounted upstream the first catalyst 200 and upstream the second catalyst 300, respectively. The reductant may e.g. be urea, hydrocarbons, hydrogen, or any other suitable species with reducing properties. $NO_x$- and/or NH3 sensors 220, 320 are mounted downstream the first and second catalysts, 200, 300, respectively. Alternatively, the first NOx- and for NH3 sensor 220 could be omitted.

Figure 2B:
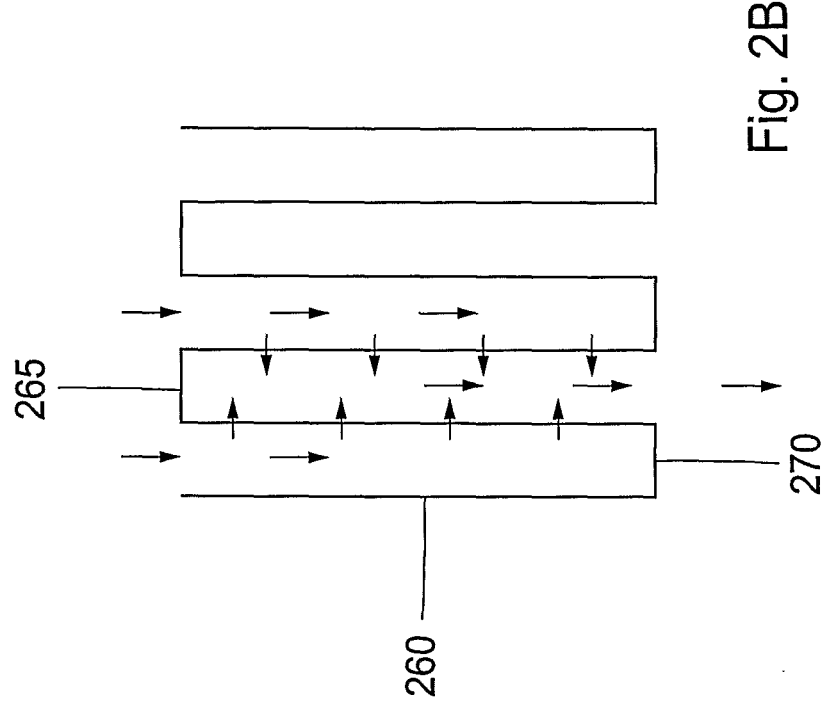
Figure 2A:
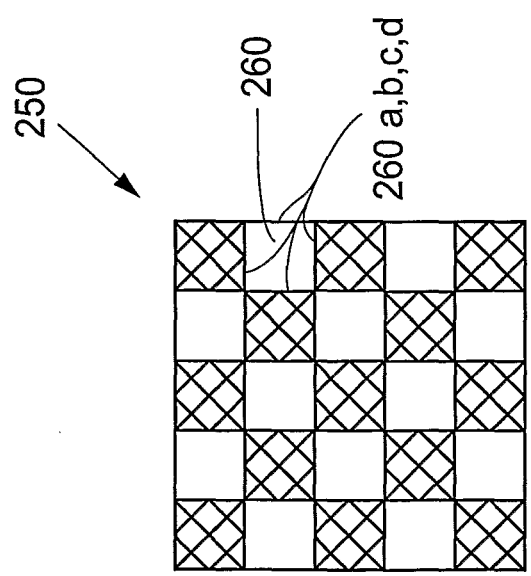
FIG. 2a is a top view of a portion of a filter medium that could be used as a catalyst.

Both catalysts 200 and 300 are so called SCR (Selective Catalyst Reduction) catalysts, whose function is well known by persons skilled in the art and briefly described above in the prior art section. The catalyst 200 is however further provided with a filter function in order to filter the particles emanating from the CI engine. Such a catalyst is basically designed as a particulate filter, which is coated with an SCR coating in order to obtain a double function, as both a filter and an SCR catalyst. The SCR coating could be provided on either the upstream side of the filter or on the downstream side of the filter or on both, and could be any suitable coating serving as an SCR catalyst. In FIG. 2a, a portion of SCR coated filter medium 250 constituting the first catalyst 200 is shown in a top view; in FIG. 2b, the same portion of the filter medium 250 is shown in a side section view. The filter medium 250 comprises several elongate filter cells 260, each filter cell being defined by four walls 260a, b, c and d and either an upstream surface 265 or a downstream surface 270; every other cell will be provided with the upstream surface, and its neighboring cells will be provided with downstream surfaces. The walls 260a, b, c and d are made of a porous material, with a pore size that is sufficiently small to trap particulates emanating from the combustion in the engine. The function of the filter is basically that unfiltered exhaust gases will enter filter cells with an open upstream end, and pass the walls of that cell to cells with an open downstream end, hence being able to escape the filter medium through the downstream open end. Hereinafter, the surface of the walls 260a, b, c and d facing a cell with an open upstream end will be referred to as the "upstream wall surface", whereas the other wall surface will be referred to as the "downstream wall surface". A filter system such as described above is often referred to as a "wall-through-flow" filter.

According to the invention, either or both of the upstream and downstream wall surfaces of the cells are coated with an SCR coating; this enables double functions of the first catalyst, namely the functions of filtering' particulates and enabling an SCR reaction between $NO_x$ and reductant, in order to reduce emissions of NOx. Such a double function is, of course, beneficial in terms of production economy, but there is also another benefit, namely that the SCR reaction could help burning off particles stuck in the filter, which would make it possible to prolong the periods between filter regenerations, or, in the best case, make them superfluous.

There is also a possibility to use different SCR coatings on the upstream and downstream sides of the wall surfaces 260a, b, c and d; different SCR coatings have different temperature regions where they have their maximum performance. Hence, it is possible to obtain a catalyst having a wide temperature range.

If, under any circumstances, the exhaust temperature should need adjustment, this could be achieved by the exhaust pressure governor 400; as is well known by persons skilled in the art, the exhaust temperature could be elevated by letting the engine work against a high exhaust pressure. From a fuel economy point of view, it is, however, always most beneficial to run an engine towards an as low exhaust pressure as possible.

In another embodiment of the invention, either of the upstream wall surface or the downstream wall surface is coated with an oxidizing catalytic coating. This coating will oxidize possible contents of fuel, i.e. hydrocarbons, in the exhausts, which oxidation will increase exhausts temperature and reduce emission of hydrocarbons to the environment.

According to the invention, the wall surface not coated with oxidizing catalytic coating is coated with an SCR coating. Examples of oxidizing catalytic coatings include various noble metals, e.g. platinum (Pt), palladium (Pd), rhodium (Rh), or iridium (Ir), base metal oxides, or mixtures thereof.

In order to burn off particles stuck in the pores of the filter, it might be necessary to elevate the exhaust temperature under a certain period. This could be done in a number of ways, e.g. by injecting fuel at a late timing, use a post injection, by inlet air throttling, variable valve actuation, exhaust gas recirculation, or by any other method known by persons skilled in the art. Use of an oxidizing catalyst enables elevation of the exhaust gas temperature by injecting fuel in the exhaust as stream upstream the oxidation catalyst (e.g., via injector 500); this fuel will burn catalytically on the oxidation catalyst, and hence increase the exhaust temperature downstream the oxidation catalyst. To achieve the maximum benefit regarding burning off particles in the catalyst 200, the catalytic coating is preferably coated on the upstream surface of the cell walls 260a, b, c and d.

Of course, it is also possible to use a separate oxidation catalyst mounted upstream the first catalyst 200. The use of a clean-up catalyst function, for limiting the emission of injected reductant, located downstream catalyst 300, is also normal practice for any SCR system, and is hence not shown in the figures. The first catalyst 200 could also consist of a filter substrate that has less filtration efficiency than a wall through flow filter.

The second catalyst 300 could be similar to the first catalyst 200, but is preferably of a more conventional catalyst design. In still another embodiment of the invention, both the first and the second catalysts 200, 300 are of conventional design. In such a case, a particle filter (not shown) should be mounted upstream the two catalysts. The particle filter of this embodiment must be regenerated using any of the methods mentioned above.

In order to control the amount of reductant injected into the exhaust gases, the two reductant injectors 210, 310 are controlled by the controller C. The controller C in turn gets input from a NOx formation model based on parameters such as engine load, engine speed, inlet air temperature, charge pressure and other engine parameters on which NOx formation depend. The NOx formation model gives a rough estimate of the amount of reductant needed to get a satisfactory NOx conversion in the first and second catalysts 200 and 300.

In order to further refine the control of the amount of reductant injected into the exhaust gas, and especially if the reductant is urea or ammonia, information from the NOX/NH3 sensors 220, 320 could be used to fine-tune the amount of reductant being injected into the exhaust gases. In one embodiment of the invention, both NOX and NH3 sensors could be used; this gives an increased level of security, since both the level of NOx and the level of NH3 could be monitored. If e.g. a NOx sensor would supply a too high value of the NOx content in the exhausts, which normally would make the controller C inject too large amounts of reductant, this could be avoided by the provision of an NH3 sensor, which in such a case would signal presence of large amounts of NH3 (originating from reductant injected into the exhaust gas) in the exhausts, hence making it possible for the controller C to correct the amount of reductant being injected into the exhausts. Obviously, if the values from the NOx and NH3 sensors do not make sense, the controller C must notify the driver, or store such malfunction indication in an onboard diagnostics box (not shown) for later readout at a service station. Above, exemplary embodiments of a NOx reduction system for a CI engine have been shown. By the efficiency of the system, it is possible to run a CI engine in a mode optimized for fuel efficiency and low emissions of soot, since the NOx emissions produced in such a mode will be efficiently reduced in the catalyst system according to the invention.

Above, exemplary embodiments of the present invention have been shown; as could be understood by persons skilled in the art, it is possible to make many diversions from the described embodiments.

The invention claimed is:

1. Selective catalytic reduction system for reducing nitric oxides emission levels from a compression ignition engine, comprising
    a first reductant injector located upstream of a first catalyst comprising a selective catalytic reduction coating and an oxidizing catalytic coating, the first catalyst comprising an upstream wall surface and a downstream wall surface, one of the upstream wall surface and the downstream wall surface being coated with the selective catalytic reduction coating and the other one of the upstream wall surface and the downstream wall surface being coated with the oxidizing catalytic coating separate from the selective catalytic reduction coating;
    a second reductant injector located downstream of the first catalyst;
    a second catalyst placed downstream of the second reductant injector and comprising a selective catalytic reduction coating, wherein the first catalyst comprises a filter function to trap particles formed by combustion, and
    an exhaust governor disposed upstream of any other components comprising the selective catalytic reduction system, the exhaust governor being located downstream of the compression ignition engine and being arranged to manage the temperature, and thus the performance window, of the selective catalytic reduction system.

2. The selective catalytic reduction system of claim 1, wherein the first catalyst comprises a multitude of elongate cells, alternately having closed and open top and bottom ends, respectively, wherein a gas flow is forced to pass through cell walls constituting the cells.

3. The selective catalytic reduction system of claim 2, wherein the oxidizing catalytic coating is coated on an upstream side of the cell walls.

4. The selective catalytic reduction system of claim 1, further comprising sensors sensing presence of nitric oxides and/or ammonia in the exhaust from the engine.

5. The selective catalytic reduction system of claim 4, wherein the sensors are placed downstream the first catalyst and downstream the second catalyst, respectively.

6. The selective catalytic reduction system of claim 1, comprising a fuel injector upstream of the first catalyst.

7. Method for reducing emission of nitric oxides from a compression ignition engine, whose exhaust system comprises:
    a selective catalytic reduction system comprising
        a first reductant injector located upstream of a first catalyst comprising a selective catalytic reduction coating and an oxidizing catalytic coating,
        a second reductant injector located downstream of the first catalyst; and
        a second catalyst placed downstream of the second reductant injector and
    comprising a selective catalytic reduction coating,
    wherein the method comprises:
    trapping particles in a filter function arranged in the first catalyst,
    predicting a content of nitric oxides in an exhaust flow upstream of the first catalyst,
    calculating, based on the prediction, an amount of reductant to be injected upstream of the first catalyst,
    injecting such predicted amount of reductant upstream of the first catalyst,
    measuring a level of remaining nitric oxides in the exhaust stream downstream of the first catalyst and upstream of the second catalyst,
    adjusting the injected amount of reductant,
    predicting, based on the level of remaining nitric oxide upstream of the second catalyst, an amount of reductant to be injected upstream of the second catalyst,
    measuring the level of nitric oxides downstream of the second catalyst,
    adjusting the injected amount of reductant upstream of the second catalyst,
    adjusting a temperature and, thus, a performance window, of the selective catalytic reduction system, via an exhaust governor disposed upstream of the first reductant injector, the first catalyst, the second reductant injector, the second catalyst, and any other component of the selective catalytic reduction system, and downstream of the compression ignition engine, and
    injecting fuel upstream of the first catalyst.

8. The method according to claim 7, comprising injecting fuel upstream of the first catalyst so that oxidation of the fuel by the oxidizing catalytic coating raises a temperature of an exhaust stream sufficiently to burn off particles stuck on the first catalyst.

* * * * *